United States Patent
Yoshioka

(12) 
(10) Patent No.: US 6,318,201 B1
(45) Date of Patent: Nov. 20, 2001

(54) MOTOR VEHICLE DIFFERENTIAL BEARING PRE-LOAD MECHANISM

(75) Inventor: Jun Yoshioka, Fort Wayne, IN (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/443,399

(22) Filed: Nov. 19, 1999

(51) Int. Cl.⁷ .......................... F16H 57/02; F16H 48/00
(52) U.S. Cl. ...................... 74/424; 74/607; 384/563; 384/583; 475/246
(58) Field of Search .......................... 384/583; 475/246, 475/230; 74/409, 424, 607; 267/158, 159, 160, 161, 163

(56) References Cited

U.S. PATENT DOCUMENTS

| | | |
|---|---|---|
| 2,548,258 | 4/1951 | Griffith . |
| 2,911,855 | 11/1959 | Opocensky . |
| 3,715,936 | 2/1973 | Jones . |
| 3,726,576 | 4/1973 | Barnbrook et al. . |
| 3,774,896 * | 11/1973 | Rode .................................. 267/182 |
| 3,900,232 * | 8/1975 | Rode .................................. 384/517 |
| 4,067,585 * | 1/1978 | Rode .................................. 277/379 |
| 4,611,935 | 9/1986 | Rode . |
| 5,269,731 | 12/1993 | Scudder et al. . |
| 5,624,345 | 4/1997 | Graft et al. . |

* cited by examiner

Primary Examiner—David A. Bucci
Assistant Examiner—William C. Joyce
(74) Attorney, Agent, or Firm—Scott M. Oldham; Hahn, Loeser + Parks LLP

(57) ABSTRACT

A motor vehicle differential bearing pre-load mechanism which provides for the simultaneous use of a collapsible spacer which plastically deforms and has a close to linear load to deflection band on one side of a motor vehicle differential assembly and a threaded adjuster on the other side of the motor vehicle differential assembly to axially pre-load the differential bearings in motor vehicle differential axles or on any shaft with bearings which requires an axial pre-load. Typically, the axial pre-load of the differential bearings decreases as wear of the differential bearings occurs when mechanical shims or a threaded adjuster without a collapsible spacer have been used. In practice, once the motor vehicle differential case with the differential bearings is installed in the motor vehicle differential carrier with a new non-compressed collapsible spacer, the threaded adjuster is tightened until the collapsible spacer plastically deforms and until the ring gear and the pinion gear are adjusted to provide an appropriate gap between the pinion teeth and the ring gear teeth to provide proper backlash.

19 Claims, 1 Drawing Sheet

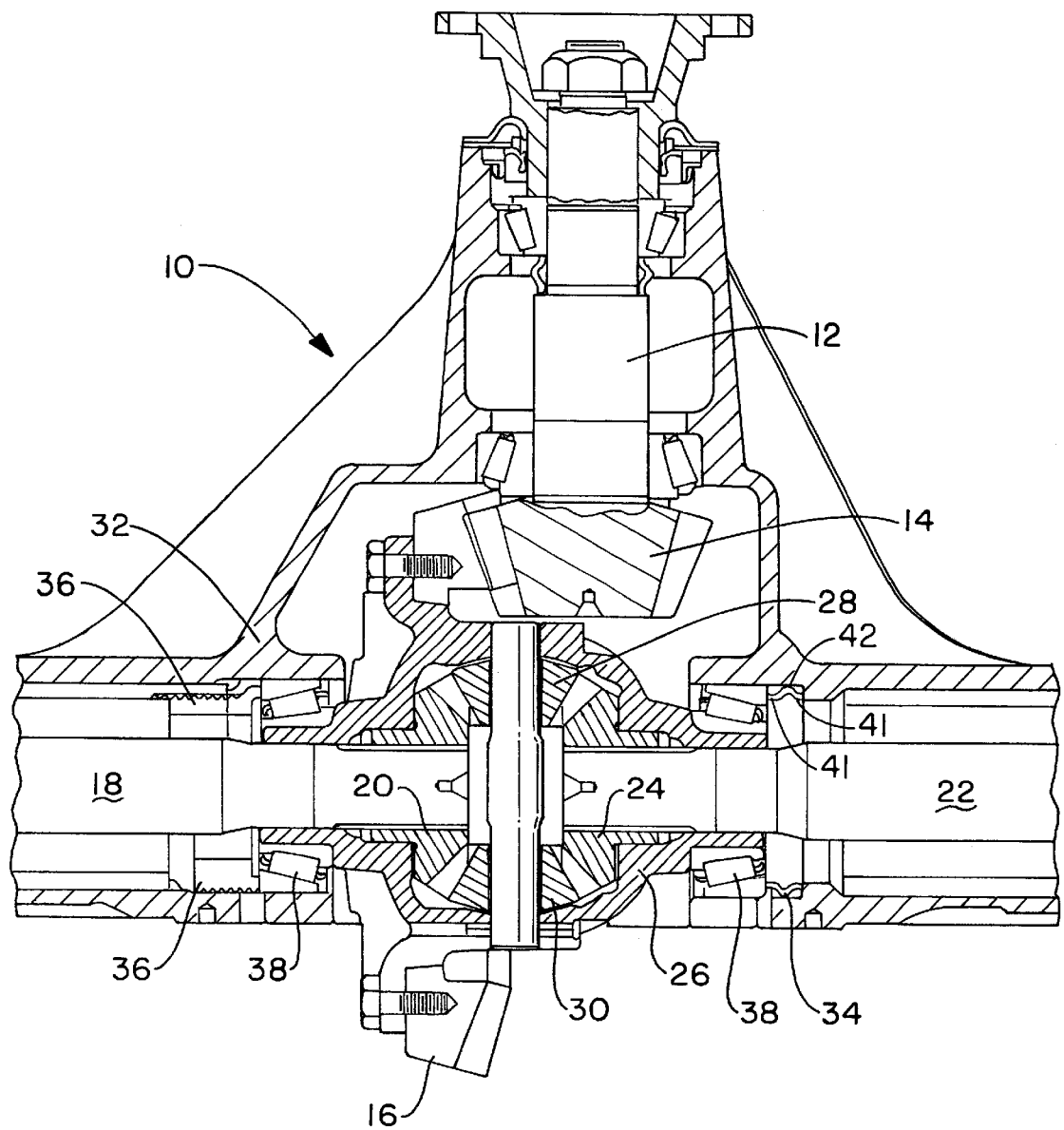

MOTOR VEHICLE DIFFERENTIAL BEARING PRE-LOAD MECHANISM

BACKGROUND AND SUMMARY OF THE INVENTION

The present invention relates generally to a new and novel motor vehicle differential bearing pre-load mechanism. More particularly, the present invention relates to a new and novel motor vehicle differential bearing pre-load mechanism having a collapsible spacer which plastically deforms and has a close to linear load to deflection band on one side of the motor vehicle differential axle assembly and a threaded adjuster on the other side of the motor vehicle differential axle assembly to axially pre-load the differential bearings in motor vehicle differential axles or on any shaft with bearings which requires an axial pre-load.

In known prior art motor vehicle differential axle assemblies, one of the most time consuming operations during installation of the motor vehicle differential case into the motor vehicle axle carrier is the proper positioning of the ring gear in relation to the pinion gear and the appropriate set up of the differential bearings for proper axial pre-load.

It would be desirable to provide a motor vehicle differential assembly which allows for faster assembly of the motor vehicle differential case into the motor vehicle axle carrier, proper positioning of the ring gear in relation to the pinion gear and appropriate axial pre-load of the differential bearings.

A preferred embodiment of the present invention is, therefore, directed to a motor vehicle differential bearing pre-load mechanism which provides for the simultaneous use of a collapsible spacer which plastically deforms and has a close to linear load to deflection band on one side of a motor vehicle differential axle assembly and a threaded adjuster on the other side of the motor vehicle differential axle assembly to axially pre-load the differential bearings in motor vehicle differential axles or on any shaft with bearings which requires an axial pre-load. Typically, the axial pre-load of the differential bearings decreases as wear of the differential bearings occurs when mechanical shims or a threaded adjuster without a collapsible spacer have been used. In practice, once the motor vehicle differential case with the differential bearings is installed in the motor vehicle differential carrier with a new non-compressed collapsible spacer, the threaded adjuster is tightened until the collapsible spacer plastically deforms and until the ring gear and the pinion gear are adjusted to provide an appropriate gap between the pinion teeth and the ring gear teeth to provide proper backlash.

Other advantages and novel features of the present invention will become apparent in the following detailed description of the invention when considered in conjunction with the accompanying drawing.

BRIEF DESCRIPTION OF THE DRAWING

The single FIGURE is a side elevational view, partially in cross-section and partially in plan view, of a motor vehicle differential bearing pre-load mechanism in accordance with a preferred embodiment of the present invention.

DETAILED DESCRIPTION OF THE DRAWINGS

In the following detailed description of a preferred embodiment of the present invention, reference is made to the accompanying drawing which, in conjunction with this detailed description, illustrates and describes a preferred embodiment of a motor vehicle differential bearing pre-load mechanism in accordance with the present invention. Referring now to the drawing, which illustrates a side elevational view, partially in cross-section and partially in plan view, of motor vehicle differential bearing pre-load mechanism in accordance with a preferred embodiment of the present invention, motor vehicle differential axle assembly 10 generally includes input shaft 12 having pinion gear 14, ring gear 16, first output shaft 18 having first output gear 20 and second output shaft 22 having second output gear 24.

Motor vehicle differential case 26 partially houses first output gear 20 on first output shaft 18 and second output gear 24 on second output shaft 22, as well as first pinion mate gear 28 and second pinion mate gear 30. Ring gear 16 is positioned outboard of motor vehicle differential case 26 and receives rotational power from input shaft 12. Motor vehicle differential carrier 32 houses motor vehicle differential case 26, as well as the ends of first output shaft 18 and second output shaft 22. Motor vehicle differential carrier 32 also houses bearings, spacers, seals and fasteners, which are preferably of conventional design, for motor vehicle differential axle assembly 10.

Motor vehicle differential axle assembly 10 also includes collapsible spacer 34 which is positioned between one of first output shaft 18 and second output shaft 22 and motor vehicle differential carrier 32. Collapsible spacer 34 plastically deforms and preferably has a close to linear load to deflection band. Threaded adjuster 36 is positioned between the other of first output shaft 18 or second output shaft 22 to axially pre-load differential bearings 38 on first output shaft 18 and second output shaft 22. The axial pre-load of differential bearings typically decreases as wear of the differential bearings occurs when mechanical shims or a threaded fastener without a collapsible spacer have been used. In practice, once motor vehicle differential case 26 with differential bearings 38 is installed in motor vehicle differential carrier 32 with a new noncompressed collapsible spacer 34, threaded adjuster 36 is tightened until collapsible spacer 34 plastically deforms and until ring gear 16 and pinion gear 14 are adjusted to provide an appropriate gap between pinion gear 14 teeth and ring gear 16 teeth to provide proper backlash. Collapsible spacer 34 is comprised of two axially extending straight portions 41 connected by an arcuate central portion 42. The free ends of the straight portions 41 contact adjacent surfaces of the output shafts 18, 22 and the motor vehicle differential carrier 32.

Although the present invention has been described above in detail, the same is by way of illustration and example only and is not to be taken as a limitation on the present invention. For example, while collapsible spacer 34 and threaded adjuster 36 are shown being used in conjunction with motor vehicle differential axle assembly 10, it will be appreciated that similar arrangements could be used on other shafts with bearings that require an axial pre-load. For example, collapsible spacer 34 and threaded adjuster 36 could be used on banjo style axles, independent suspension axles, Salisbury type axles and other applications where a shaft with a one or more bearings, such as a pair of roller bearings, needs to be pre-loaded axially. Accordingly, the scope and content of the present invention are to be defined only by the terms of the appended claims.

What is claimed is:
1. A motor vehicle differential axle assembly, comprising:
   a motor vehicle differential carrier;
   a first output shaft extending outwardly in a first direction from said motor vehicle differential carrier and supported by a first bearing;

a second output shaft extending outwardly in a second direction substantially opposite to said first direction from said motor vehicle differential carrier and supported by a second bearing;

a collapsible spacer positioned between one of said first output shaft and said second output shaft and said motor vehicle differential carrier, the collapsible spacer comprising two axially extending straight portions connected by an arcuate central portion, free ends of the axially extending straight portions contacting adjacent surfaces of one of the bearings and the motor vehicle differential carrier; and a threaded adjuster positioned between the other of said first output shaft and said second output shaft and said motor vehicle differential carrier, such that as said threaded adjuster is tightened, said collapsible spacer plastically deforms.

2. The motor vehicle differential axle assembly in accordance with claim 1, wherein deformation of said collapsible spacer pre-loads said bearings on said first output shaft and said second output shaft.

3. The motor vehicle differential axle assembly in accordance with claim 1, wherein each of said bearings of said first output shaft and said second output shaft include roller bearings and deformation of said collapsible spacer axially pre-loads said roller bearings on said first output shaft and said second output shaft.

4. The motor vehicle differential axle assembly in accordance with claim 3, wherein said collapsible spacer has a close to linear load to deflection band.

5. The motor vehicle differential axle assembly in accordance with claim 4, wherein said motor vehicle differential assembly includes an input shaft having a pinion gear and a ring gear and said collapsible spacer deforms as said ring gear and said pinion gear are adjusted to provide an appropriate gap between said pinion gear and said ring gear to provide proper backlash.

6. The motor vehicle differential axle assembly in accordance with claim 5, wherein said collapsible spacer is fabricated from a metallic material.

7. The motor vehicle differential axle assembly in accordance with claim 1, wherein said collapsible spacer has a close to linear load to deflection band.

8. The motor vehicle differential axle assembly in accordance with claim 1, wherein said motor vehicle differential assembly includes an input shaft having a pinion gear and a ring gear and said collapsible spacer deforms as said ring gear and said pinion gear are adjusted to provide an appropriate gap between said pinion gear and said ring gear to provide proper backlash.

9. The motor vehicle differential axle assembly in accordance with claim 8, wherein said collapsible spacer is fabricated from a metallic material.

10. The motor vehicle differential axle assembly in accordance with claim 9, wherein said collapsible spacer has a close to linear load to deflection band.

11. The motor vehicle differential axle assembly in accordance with claim 1, wherein said collapsible spacer is fabricated from a metallic material.

12. A motor vehicle differential bearing pre-load mechanism for a motor vehicle differential axle assembly having a first output shaft, supported by a first bearing a second output shaft supported by a second bearing and a motor vehicle differential carrier, said motor vehicle differential bearing pre-load mechanism comprising:

a collapsible spacer capable of being positioned between one of the first output shaft and the second output shaft and the motor vehicle differential carrier, the collapsible spacer comprising two axially extending straight portions connected by an arcuate central portion, free ends of the axially extending straight portions contacting adjacent surfaces of one of the bearings and the motor vehicle differential carrier; and a threaded adjuster capable of being positioned between the other of the first output shaft and the second output shaft and the motor vehicle differential carrier, such that as said threaded adjuster is tightened, said collapsible spacer plastically deforms.

13. The motor vehicle differential bearing pre-load mechanism in accordance with claim 12, wherein each of said bearings of the first output shaft and the second output shaft include roller bearings and deformation of said collapsible spacer axially pre-loads the roller bearings on the first output shaft and the second output shaft.

14. The motor vehicle differential bearing pre-load mechanism in accordance with claim 13, wherein said collapsible spacer has a close to linear load to deflection band.

15. The motor vehicle differential bearing pre-load mechanism in accordance with claim 14, wherein the motor vehicle differential assembly includes an input shaft having a pinion gear and a ring gear and said collapsible spacer deforms as the ring gear and the pinion gear are adjusted to provide an appropriate gap between the pinion gear and the ring gear to provide proper backlash.

16. The motor vehicle differential bearing pre-load mechanism in accordance with claim 15, wherein said collapsible spacer is fabricated from a metallic material.

17. The motor vehicle differential bearing pre-load mechanism in accordance with claim 12, wherein said collapsible spacer has a close to linear load to deflection band.

18. The motor vehicle differential bearing pre-load mechanism in accordance with claim 12, wherein said motor vehicle differential assembly includes an input shaft having a pinion gear and a ring gear and said collapsible spacer deforms as the ring gear and the pinion gear are adjusted to provide an appropriate gap between the pinion gear and the ring gear to provide proper backlash.

19. The motor vehicle differential bearing pre-load mechanism in accordance with claim 12, wherein said collapsible spacer is fabricated from a metallic material.

* * * * *